Dec. 12, 1967 D. B. GIBSON 3,358,085

DRIVE-FAILURE CONTROL APPARATUS FOR DICTATING MACHINES

Filed March 2, 1964

INVENTOR.
DONALD B. GIBSON

BY George H. Fritzinger
AGENT 3,358,085
DRIVE-FAILURE CONTROL APPARATUS FOR DICTATING MACHINES Donald B. Gibson, Passaic, N.J., assignor to McGraw-Edison Company, Elgin, Ill., a corporation of Delaware Filed Mar. 2, 1964, Ser. No. 348,449
8 Claims. (Cl. 179—6)

This invention relates to dictating-machine systems wherein the dictator is prevented from observing whether the drive mechanism is working or not by reason of the recording apparatus being enclosed or remote from the dictator's station. Such remote dictating systems include multi-station systems for recording over telephone lines as well as automatic telephone answering systems for recording incoming messages when a called party is absent. More particularly, the invention relates to a novel sensing means for detecting when the motion of the record relative to the recorder head is inadequate—i.e., too slow or stopped—to enable proper recording, and to a means for providing a warning and/or a disabling of the whole system responsive to such drive failure.

A mere warning to the user or machine attendant when a drive failure occurs is oft-times insufficient in remote dictating machine systems because such drive failure may be of an intermittent nature with the result that the machine is put back in service by the attendant without it having been repaired only to fail soon again during subsequent use. In accordance with the invention a drive failure is caused to produce not only a suitable signal as a warning to the attendant but is caused also to blow a principal fuse of the machine to disconnect the dictator from the telephone line and to render the machine permanently disabled until the fuse is replaced. Since only authorized servicemen have access to the equipment to replace such a fuse it is assured that the machine will have been checked out by a servicemen before it is restored to use. Further, it is an object and feature of the invention to provide a new and improved sensing mechanism responsive immediately to any failure in the drive system to provide a suitable indicating and/or control operation.

Another object of the invention is to provide a motion-failure sensing apparatus which operates on the principle of intermittently shunting a condenser to prevent build up of a voltage thereacross sufficient to trigger operation of a warning or control circuit so long as the speed of the record rotation has not fallen below an operating range.

Another object is to disable the machine by blowing a fuse whenever a failure occurs in the drive mechanism of the apparatus.

A further object is to provide a message recorder with an available sensing means to disconnect a telephone subscriber from the recorder when a drive failure occurs.

These and other objects and features of the invention will be apparent from the following description and the appended claims.

Figure 1:
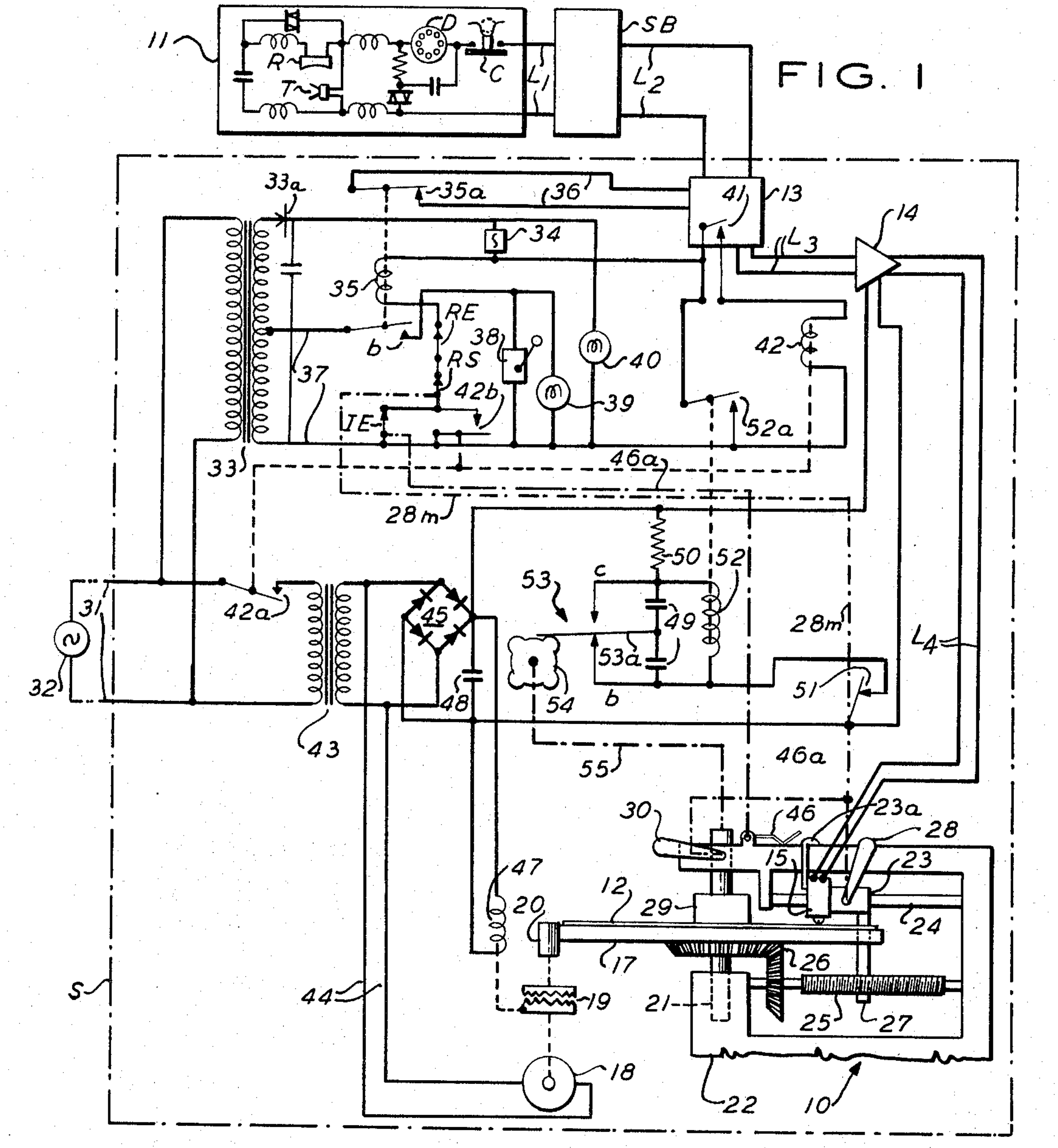
Figure 2:
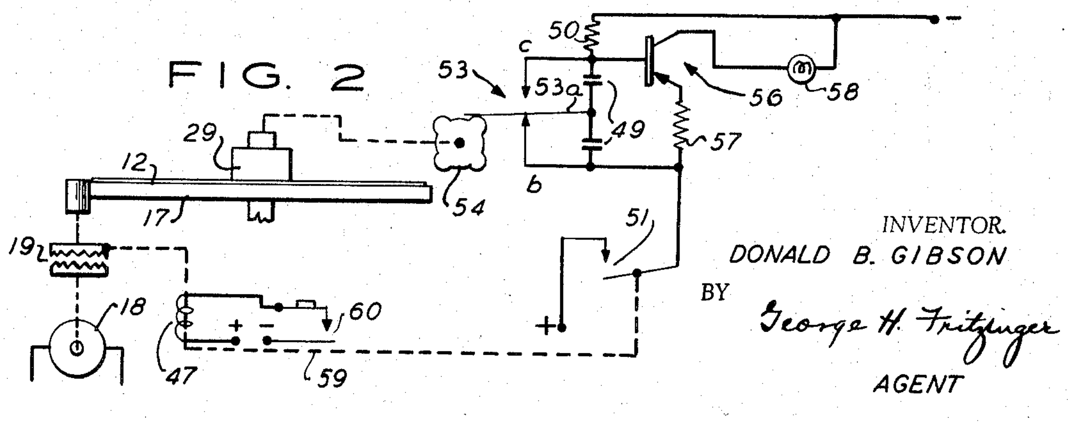

In the description of my invention reference is had to the accompanying drawings of which:

FIGURE 1 is a schematic diagram of circuits and mechanism illustrating the application of my invention to a system for recording messages from a remote subscriber over telephone lines; and FIGURE 2 is a schematic circuit diagram showing a modified form of drive-failure sensing means.

The illustrative embodiment of my invention shown in FIGURE 1 is an incoming message recorder 10 for recording messages from a remote subscriber's telephone set 11 on a record 12 of the machine. The telephone subscriber's set is a standard one including a cradle switch C, a dial D, a receiver R and a transmitter or microphone T. The telephone set is connected by telephone line $L_1$ to a switchboard SB and from the switchboard via a telephone line $L_2$ to the recording station S. The line $L_2$ connects through a call-sensing box 13 supplied by the telephone company and herein only diagrammatically shown. From the call-sensing box the connection is made through a line $L_3$, an amplifier 14 and a line $L_4$ to the recorder head 15 of the recording machine.

The recording machine 10 may be of any suitable form comprising for example a turntable 17 for carrying a disk record 12, and a drive mechanism for the turntable including a motor 18, clutch 19 and drive wheel 20 frictionally engaging the rim of the turntable. The turntable is journaled at 21 in a frame 22 fractionally shown. A carriage 23 is mounted on a shaft 24 supported by the frame 22 and carries the recorder head 15 for traveling movement across the record 12. The carriage is driven by a feed screw 25 journaled in the frame 22 and coupled by bevel gearing 26 to the turntable. A feed nut 27 on the carriage engages the feed screw. By means of a lever 28 the head 15 may be lifted and the feed nut 27 disengaged through standard mechanism (not shown) to permit the head to be shifted to home position and the record disk to be changed. Journaled also in the frame 22 is a record centering and clamping member 29 which seats on the central hub area of mounted record 12 to hold it firmly in place on the turntable. This clamping member may be raised by a manual lever 30 through suitable mechanism (not shown) to permit a record to be changed on the turntable.

The recording station has two incoming power leads 31 connected to a 60 cycle 110 volt source indicated at 32. This power source in connected permanently via a transformer 33, rectifier 33*a* and fuse 34 to a so-called availability relay 35. This relay is thus normally activated. One set of contacts 35*a* of this relay is held closed and another set 35*b* is held open when the relay is activated. The closed contacts 35*a* are connected serially in a recognition circuit 36 leading from the call-sensing box 13 to complete the telephone line and permit calls to be made to the message recorder so long as the availability relay is energized. The other set of contacts 35*b* is connected in a signal circuit 37 including a buzzer 38 and a signal light 39 to hold this signal circuit normally open. A power indicating lamp 40 is connected across the secondary of transformer 33 to give an "on" indication so long as a connection is made to the power source.

Connected also across the secondary of the transformer 33 via the fuse 34 and a switch 41 is a start relay 42. As soon as a subscriber lifts his handset for the cradle and dials a telephone number the call-sensing box 13 closes the switch 41 provided the recognition circuit 36 is already closed. Closure of the switch 41 activates the start relay 42 to close an on-off switch 42*a* in the power line. Closure of the on-off switch 42*a* completes a connection from the power source 32 through the transformer 43 and line 44 to the drive motor 18 for the recording machine. Also, closure of the on-off switch 42*a* completes connection to the power transformer 43 and a full wave rectifier 45 to a clutch solenoid 47 across which is also connected a filter condensesr 48. Thus, when the on-off switch 42*a* is closed both the drive motor 18 is started and the clutch 19 is engaged to start the turntable running.

In the circuit of the availability relay 35 there is a record end switch RE, a record safety switch RS and an intermediate end switch IE. These switches are serially connected and stand normally closed. When the carriage 23 reaches the end of the record the record end switch RE is opened by standard mechanism (not shown). If either the record clamp 29 is raised by the lever 30 or the recorder head is raised from the record 11 by the lever 28 the record safety switch RS is opened through a coupling mechanism diagrammatically indicated by the tie line 28*m* in accordance with the teachings of the Dann Patent No. 2,524,561, dated Oct. 3, 1950. Further, as the carriage 23 is advanced into about the latter one-third portion of its travel range an upstanding arm 23*a* thereon cams a lever 46 which is coupled as indicated by the tie line 46*a* to the intermediate end switch IE to open this switch in accordance with the teachings of the Kobler Patent No. 2,650,951, dated Sep. 1, 1953. However, in order that the opening of this intermediate end switch will not drop out the availability relay 35 while the machine is in use the start relay 42 has a second set of contacts 42*b* which are connected in shunt with the intermediate end switch IE and which are held closed so long as the start relay is activated.

The drive-failure detecting apparatus of my invention comprises a pair of series connected condensers 49 and a serially connected voltage cut down resistor 50 which are supplied with direct current from the full wave rectifier 45 through a switch 51 controlled also jointly by the record clamp lever 30 and the carriage control lever 28 through the coupling 28*m* abovementioned so that this switch is closed only when a record is clamped to the turntable and the recorder head is in engagement with the mounted record. Connected across the pair of condensers 49 is a drive-failure detecting relay 52. Also connected across the condensers 49 is a single-pole double-throw alternating switch 53 having its pole 53*a* connected to the junction between the two condensers and its contacts *b* and *c* connected to the sides of the condensers opposite their common junction. The pole 53*a* is operated by a four lobe cam 54 which is coupled to the record clamping member 29, as indicated diagrammatically by the tie line 55, so that the cam is driven in unison with the record clamping member. So long as the drive motor 18 is running and is connected through the clutch 19, drive wheel 20 and turntable 17 to the record disk 12, the record clamping member 29 is rotated to drive the cam 54. As long as the record 12 is driven at an adequate speed for proper recording the switch 53 is reciprocated at a sufficient rate to short alternately the two condensers 49 and prevent a build up of voltage thereacross sufficient to operate the detecting relay 52. However, should slippage occur anywhere in the drive system to cause the record 12 to rotate at an inadequate speed, or should the drive system fail completely, the voltage will build up across one or both of the condensers 49, depending upon whether the switch 53 is stopped in an intermediate or an end position, to activate the relay 52. By way of illustrative example, a normal record speed may be 20 r.p.m. and the RC time constant of the resistor 50 and each condenser 49 may be approximately one second.

The relay 52 has a pair of normally open contacts 52*a* connected across the availability relay 35. When the relay 52 is activated by a drive failure as abovedescribed, the contacts 52*a* are closed to place a short across the availability relay. This short will blow the fuse 34 to remove power permanently from the availability relay 35 and the start relay 42. The resultant drop out of the availability relay opens the recognition circuit 36 to disconnect the subscriber from the telephone line and to apprise him by dial tone in his receiver that a failure in the recording apparatus has occurred. The opening of the telephone line restores the switch 41 of the call-sensing box 13 to open position but without any further effect because the circuit to the start relay 42 is already open. The drop-out of the start relay 42 opens the on-off switch 42*a* to remove all power from the recording machine 10. Also, the drop-out of the start relay 42 opens the switch 42*b* to remove the short across the intermediate end switch IE.

In order that suitable warning will be given when a drive failure occurs the signal circuit 37 is closed by the switch contacts 35*b* as the availability relay drops out, to start the buzzer 38 and to light the signal lamp 39. Since this signal is given responsive to the fuse 34 having been blown, the system cannot be put back into operation by the attendant. Instead, the system will have to be checked by a serviceman since he is the only one equipped to replace the blown fuse. Thus, once a drive failure occurs there will be adequate assurance that the system will be fully checked out and repaired before it is restored to service.

In the modification of my invention shown in FIGURE 2, the base and emitter electrodes of a transistor 56 are connected across the condensers 49, and the collector electrode is connected through a load device, herein designated by way of example as being an indicating lamp 58, to the negative side of the power source. Alternatively, the indicating lamp 58 may be replaced by a relay as shown in FIGURE 1. Further, by way of illustrative example, the switch 51 which completes the circuit across the D.C. power source, may now be controlled by the clutch solenoid 47 as indicated by the tie line 59, and the clutch solenoid may be controlled by a start-stop switch 60 at the subscriber's or dictator's station. Here again, any failure in the drive system causing the record 12 to be driven at an inadequate speed will cause a voltage to build up across the condensers 49 to place the transistor 56 in a conducting state causing either an indicating and/or control operation to take place in the load device 58.

The embodiments of my invention herein particularly described are intended to be illustrative and not necessarily limitative of my invention since the same are subject to changes and modifications without departure from the scope of my invention, which I endeavor to express according to the following claims.

I claim:

1. In an electrical apparatus to be connected to a source of power: the combination of a fuse for disabling the apparatus upon blowout of the fuse, a reciprocable single-pole double-throw switch, means operable by said power source for reciprocating said switch between its contacts, a voltage cut-down resistor, a pair of condensers serially connected via said resistor across said power source, means connecting the contacts of said switch across said condensers and the pole of the switch to the junction between said condensers for shorting said condensers alternately as said switch is reciprocated to cause the build-up of voltage across the condensers to vary inversely with the speed of reciprocation of said switch, and a relay controlled according to the voltage across said condensers for short-circuiting said power source via said fuse to blowout the fuse and disable said apparatus when the relay is operated by failure of said reciprocating means to alternate said switch at a predetermined speed.

2. The apparatus set forth in claim 1 including a drive mechanism, an on-off switch for supplying power continuously to said drive mechanism from said power source independently of said fuse when the on-off switch is in "on" position, means for reciprocating said reciprocable switch by said drive mechanism whereby upon build-up of voltage across said condensers responsive to failure of said drive mechanism said fuse is blown, and means responsive to a blowout of said fuse for throwing said on-off switch to "off" position.

3. In an incoming message recorder adapted to be connected to a remote subscriber's station and including a support for a record and drive means for said record support: the combination of a fuse, a start relay, means for activating said start relay via said fuse, means for starting said drive mechanism by operation of said start relay, and speed sensing means responsive to failure of said drive mechanism to rotate said record at an adequate speed for blowing said fuse whereby to drop-out said start relay.

4. The combination set forth in claim 3 including a microphone at the subscriber's station, a transmission line for transmitting messages from said microphone to said recorder, and means activated via said fuse for enabling messages to be transmitted over said transmission line to said recorder and for disabling the transmission line when said fuse is blown.

5. In an incoming message recorder for recording messages from a remote telephone subscriber's station over a telephone line including a switchboard operable by dial equipment at the subscriber's station: the combination of a record support, a recorder head cooperable with a record on said support and electrically operable drive means for producing a relative movement between said head and record, and speed sensing means responsive to the speed of relative movement between said recorder head and said record when the speed is inadequate for proper recording for opening said telephone line and disconnecting electric power from said drive means.

6. The combination set forth in claim 5 including an availability relay for placing said telephone line in operable condition when the availability relay is activated, a power circuit for said drive means, a start-stop relay including a power switch in said power circuit for closing the power circuit to supply electric current to said drive means when said start-stop relay is activated, a fuse, means for activating said availability relay via said fuse, means for activating said start-stop relay via said fuse when a connection is made over said telephone line to said recorder, and means controlled by said sensing means when the speed of relative movement between the recorder head and record is inadequate for proper recording for dropping said availability relay to disconnect said telephone line and for dropping said start-stop relay to open said power circuit.

7. The combination set forth in claim 6 including switch means in series with said abailability relay and controlled by said message recorder to prevent an activation of the availability relay when the recorder is not in proper condition for recording.

8. In a recording apparatus including a record support, a recorder head and a drive motor: the combination of a clutch for producing a relative movement between said record support and recorder head when the clutch is engaged, a speed sensing means for detecting when the speed of relative movement between said recorder head and record is inadequate for proper recording, a clutch solenoid, a start-stop switch for activating said clutch solenoid to engage and disengage said clutch, and circuit means controlled by said start-stop switch for abling and disabling said speed sensing means as said clutch is engaged and disengaged.

References Cited

UNITED STATES PATENTS

| | | | |
|---|---|---|---|
| 2,444,818 | 7/1948 | Franklin | 179—100.1 |
| 2,592,342 | 4/1952 | Ryckman | 324—70 |
| 2,615,993 | 10/1952 | Carter | 179—100.1 |
| 2,761,899 | 9/1956 | Keith et al. | 179—6 |
| 2,844,661 | 6/1958 | Kobler | 179—100.1 |
| 3,059,062 | 10/1962 | Ojala | 179—100.1 |
| 3,109,140 | 10/1963 | Chin et al. | 317—5 |

BERNARD KONICK, *Primary Examiner.*

V. P. CANNEY, *Assistant Examiner.*